United States Patent [19]

Higashiyama et al.

[11] 4,349,851
[45] Sep. 14, 1982

[54] MAGNETIC HEAD SUPPORTING MECHANISM FOR A MAGNETIC DISC APPARATUS

[75] Inventors: Noboru Higashiyama; Masaru Sasaki, both of Kamakura, Japan

[73] Assignee: Mitsubishi Denki Kabushiki Kaisha, Tokyo, Japan

[21] Appl. No.: 152,818

[22] Filed: May 23, 1980

[30] Foreign Application Priority Data

Jul. 10, 1979 [JP] Japan .................................. 54-87301

[51] Int. Cl.³ ...................... G11B 21/16; G11B 21/22; G11B 5/54
[52] U.S. Cl. ..................................... 360/105; 360/104
[58] Field of Search .......................... 360/104, 105, 99

[56] References Cited
U.S. PATENT DOCUMENTS

| 4,089,029 | 5/1978 | Castrodale et al. | 360/99 |
| 4,151,573 | 4/1979 | Tandon et al. | 360/105 |
| 4,167,766 | 9/1979 | Chau | 360/104 |
| 4,209,813 | 6/1980 | Bryer | 360/105 |
| 4,247,877 | 1/1981 | Keller | 360/104 |
| 4,250,530 | 2/1981 | Yang | 360/99 |

Primary Examiner—Robert S. Tupper
Attorney, Agent, or Firm—Oblon, Fisher, Spivak, McClelland & Maier

[57] ABSTRACT

A magnetic head supporting mechanism for a double side type flexible disc drive apparatus is rotatably driven and contains a first and second magnetic head for read-out or write-in on each magnetic recording surface of the disc. The magnetic head is slidably contacted with the surface during the operation and includes a carriage having a first and second magnetic head which is positioned on a predetermined data track of the disc with the carriage having first and second arms and one of the arms being rotated with the first and second magnetic head assemblies being mounted on the first and second arm respectively. One of the magnetic head assemblies contains a resilient holder affixed to the arm and simultaneously fixed to the magnetic head while a gimbal spring which is disposed on the holder and has a surface fitted to the head also contains a projection which is formed on the other surface. A point member is fixed on the holder at one end and is fitted in such a manner that it contacts the projection of the gimbal spring on the other end.

3 Claims, 29 Drawing Figures

MAGNETIC HEAD SUPPORTING MECHANISM FOR A MAGNETIC DISC APPARATUS

BACKGROUND OF THE INVENTION

1. Field of the Invention

The present invention relates to an improvement of an interchangeable magnetic head supporting mechanism for double-side type flexible disc drive apparatus.

2. Description of the Prior Arts

Among supporting mechanisms for this type apparatus already proposed, there is a supporting mechanism taking advantage of a two-directional flexibility of a window-frame shaped sheet spring as shown in FIGS. 1 through 4, and another supporting mechanism so designed as to push the rear surface of a magnetic head mounted on the sheet spring in contact with the center of the rear surface. Those mechanisms have not yet been matured to the mass production stage in their technical progress. The major reason for hindering the progress of the technology is of course that there has never been developed a mechanism with a good function to follow the surface of a memory medium of a head mechanism for supporting a magnetic head with pressure applied to both sides of a flexible disc. Because of a thin sheet made of polyethylene terephthalate as the disc, the rotation of the disc produces a vibrating wave in addition to a wavy motion inherently occurring with the disc rotation. The window-frame shaped directional plate spring as the supporting mechanism of the type in which a couple of heads are disposed above and below with respect to the disc, being slidably moved relative to the disc always in close contact with the disc, has the following inherent defects: (a) to be unduly sensitive to a wavy motion of the memory medium; (b) the deteriorated flatness of the plate spring member caused when the residual stress is released at the time of cutting it for shaping; (c) contracted deformation of the spring member caused when a flat cable (not shown) to provide a signal transfer to and from the magnetic head 1 is bonded to arms 5 and 5 of a support spring 2, as shown in FIGS. 1 through 4; (d) to apply an uneven pressure over the entire surface 10 of the sliding type magnetic head when it is in close contact with the medium, due to a difference between rigidities of the right and left portions of the member. There is an additional cause to facilitate the above-mentioned defects; when the magnetic head 1 is disposed with the flexible disc intervening therebetween, a line connecting the contacts on both sides of the head which are each made when the end 8 of the spring 7 pushes a projection 6 formed integrally on the support spring 2, hardly is orthogonal to the surface of the disc. Thus, the conventional supporting mechanism suffers from the manufacturing error from a static viewpoint and the defects caused by the wavy motion and the vibration of the medium from a dynamic viewpoint. Accordingly, an action line receiving the pressures from both the projections 6 and 6 can not be used for both the bifurcated head portions, so that the head poorly follows the disc. Incidentally, in FIGS. 1 to 4, reference numeral 3 designates a rectangular hole; 4 a head core; 9 a mounting base; 11 a mounting hole.

The idea of the above-mentioned supporting mechanism is exactly the same as that of a called floating mechanism used by a disc pack of aluminum alloy of a high speed rotatory type, for example. The alloy magnetic disc with high rigidity is free from an interaction of loads of the bifurcated portions of the head facing with each other when floating magnetic heads pushes both sides of the disc. This type magnetic head may be treated as a system of the mere combination of surface and a pressing projection on a thin air current layer, head floating surface. In other words, both the projections have not a common action line. Therefore, it is deemed to be erroneous to divert such an idea into the flexible disc under question.

Figure 1:
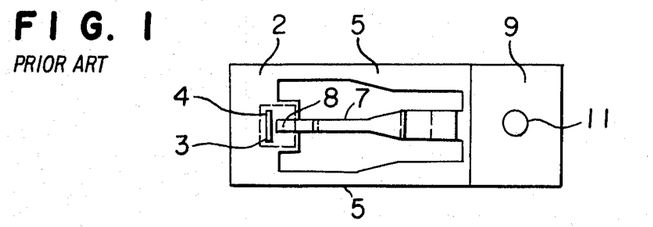
FIG. 1 is a plan view of a conventional head supporting mechanism for the upper surface of a disc 16.
Figure 2:
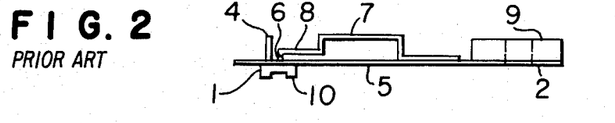
FIG. 2 is a side view of the mechanism shown in FIG. 1.
Figure 3:
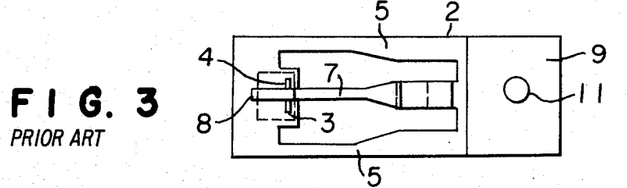
FIG. 3 is a plan view of another conventional head supporting mechanism for upper surface of the disc 16.
Figure 4:
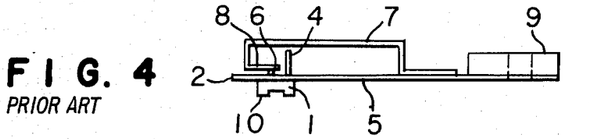
FIG. 4 is a side view of the mechanism shown in FIG. 3.
Figure 5:
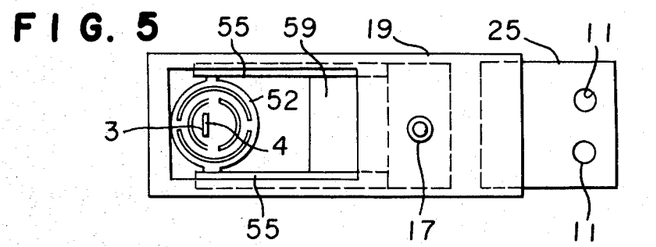
FIG. 5 is a plan view of an improved head supporting mechanism which may be used for the upper surface of the disc 16 used in the present invention.
Figure 6:
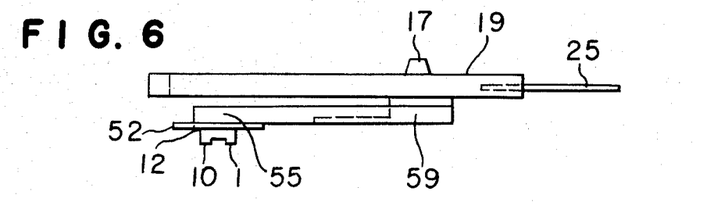
FIG. 6 is a side view of the mechanism shown in FIG. 5.
Figure 7:
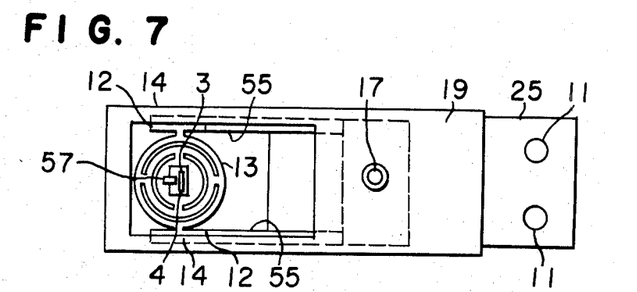
FIG. 7 is a plan view of a prior example of a head supporting mechanism according to the invention.
Figure 8:
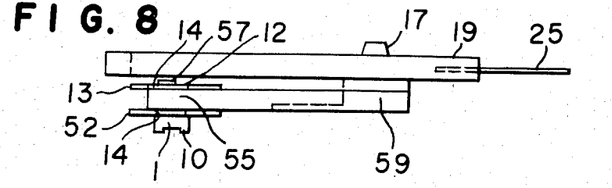
FIG. 8 is a side view of the mechanism according to the prior example.
Figure 9:
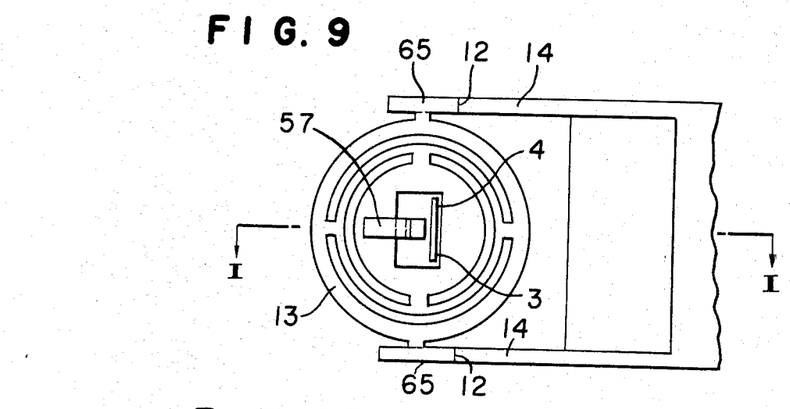
FIG. 9 is a partial enlarged view of essential part of the supporting mechanism shown in FIG. 7.

To eliminate the above-mentioned defects, there has been proposed a mechanism as shown in FIGS. 5 and 6. In the figures, reference numeral 17 is a screw; 19 a turn arm; 25 a plate spring; 52 a gimbal spring; 55 an arm. The improved mechanism has a dull sensitivity to the wavy motion and the vibration, compared to the thin plate spring. Because of the presence of crossed two-fulcrums in its shape, the memory medium following characteristic is remarkably improved. However, when the moment applied by a sliding surface 10 of the magnetic head 1 is small, the crossed two-fulcrums must have somewhat enlarged widths. In this respect, this proposal still has some problem in the two-directional rotary following characteristic.

SUMMARY OF THE INVENTION

It is an object of the present invention to provide a magnetic head supporting mechanism having a gimbal spring for supporting a sliding type magnetic head which has a simple structure and can be easily prepared and is suitable for a double side type flexible disc drive apparatus.

It is another object of the present invention to provide a magnetic head supporting mechanism which reduces flutter of a double side type flexible disc caused in its rotation by holding the disc under pushing by a pair of holders.

The foregoing and other objects have been attained by providing a magnetic head supporting mechanism for a double side type flexible disc driving apparatus which comprises means for rotatably driving an interchangeable double side type flexible disc; first and second magnetic heads for read-out or write-in on each magnetic recording surface of said double side type flexible disc; and said magnetic head being slidably contacted with said magnetic recording surface during the operation for the read-out or write-in; a carriage having said first and second magnetic heads which is driven by means for positioning said first and second magnetic heads on a predetermined data track of said double side type flexible disc; and said carriage comprising first and second arms at least one of which is rotated and first and second magnetic head assemblies which are respectively mounted on said first or second arm so as to be inter changeable of said double side type flexible disc; and only one of said first or second magnetic head assembly comprising (1) said magnetic head, (2) a resilient holder consisting of a part for fixing to said arm and a pair for fitting to said magnetic head, (3) a gimbal spring having a projection formed on the back surface to the surface fitting said magnetic head, and a point member which is fixed on said holder at one end and is fitting to said projection at the other end.

DETAILED DESCRIPTION OF THE PREFERRED EMBODIMENTS

Embodiments of a magnetic head supporting mechanism for a magnetic disc apparatus according to the invention will be described in detail referring to the drawings. In FIGS. 7 to 10 illustrating an embodiment of the magnetic head supporting mechanism which has been disclosed in U.S. Ser. No. 48,367 filed on June 14, 1979, now U.S. Pat. No. 4,306,258, reference numeral 1 designates a sliding type head which is the same as the conventional head. Reference numeral 52 is a known gimbal spring employed in the prior application, namely, a two-directional flexible crossed two fulcrum flexible plate spring. The plate spring 52 is used in place of the rectangular frame-shaped support spring 2 and is the same as that shown in FIG. 5. The spring 52 has a rectangular hole 3 at the central portion for positioning and bonding the head core 4 after it is passed therethrough. Reference numeral 55 designates arms extending from a holder 9 for mounting the mounting ends 12 and 12 of the gimbal spring 52 to the holder 19 in one piece by a spot welding or the like. Functional parts according to the prior application are attached to the rear sides of the surfaces of the arms 55 and 55 for mounting the gimbal spring 52 bearing the head 1. Another gimbal spring 13 is the same as the gimbal spring 52 with the head in the construction of the spring acting portion and the shape of the mounting ends. The difference of the gimbal spring 13 from that 52 is that the former has a load arm 57 firmly fixed thereto in place of the head 1. The tip 58 of the load arm 57 is disposed with a given distant from a projection 56 projecting from the gimbal spring 52, as well illustrated in FIG. 10. The projection 56 is the same as that formed on the rectangular frame shaped plate spring or the support spring 2, and this also is true in that its end is disposed coincident with the center of the head 1 as viewed in plane. The gimbal spring 13 is firmly fixed to the back sides 14 of the bifurcated ends 65 and 65 of the holder 59 coaxially with the gimbal spring 52 by the spot welding, for example, as in the case of the gimbal spring 52.

Figure 10:
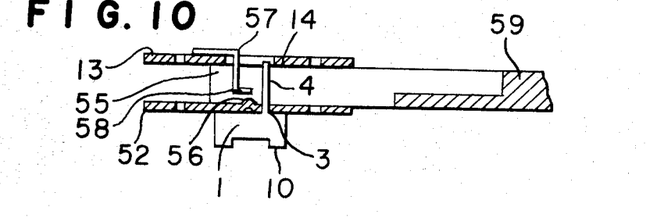
FIG. 10 is a cross sectional view taken along line I—I shown in FIG. 9.

As mentioned above, the gap is provided between the load arm 57 and the end of the projection 56 in the example under discussion. Those may be disposed in contact with each other under no load condition.

Figure 11:
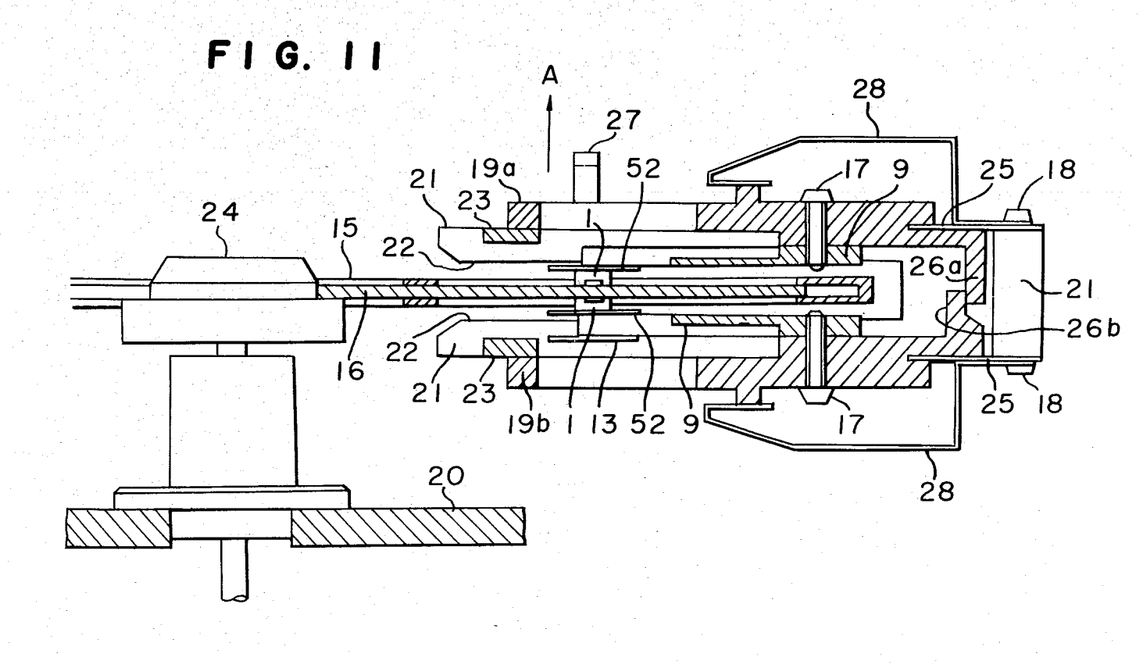
FIG. 11 is a cross sectional view of essential part obtained when the head supporting mechanism according to the invention is applied to a double side type flexible disc drive apparatus, illustrating partially a head carrying mechanism, or a carriage 21 and its associated portion.

In addition to the description thus far made of the major structure of the embodiment of the prior application, a detailed description will further be given about the differences of the magnetic head supporting and carrying mechanism and its operation between the embodiment of the prior application and the conventional one. In FIG. 11, the conventional subassembly, as shown in FIG. 5, as a supporting mechanism of the head supported by the holder 59 thereon via the gimbal spring 52 is firmly mounted to an upper turn arm 19a by means of a screw 17 so as to be disposed above the upper surface of the disc 16 contained in Diskette (flexible disc cartridge hereinafter referring to as FDC) 15. Then, the subassembly shown in FIG. 7 as the embodiment of the prior example is mounted firmly on a lower turn arm 19b so as to be disposed under the lower surface of the disc 16. After being mounted to the turn arms 19a and 19b, those subassemblies are mounted to the rear portions of the plate springs 25, as shown.

The flexible disc 16 is coupled with a rotatory spindle 24 mounted to a body base 20 by means of a fastening bolt (not shown), thereby to be rotated. The spindle 24 is rotated by a belt (not shown) driven by a motor (not shown). The shape of the overall structure of the base 20 is not illustrated because it is not essential to the invention. Generally, it is shaped like a box. In the drawing of the figure, a part of its bottom is illustrated. The rectilinear motion of the carriage 21 is performed by the rotation of a stepping motor (not shown) mounted on a part of the body base 20 by screwing an external screw (not shown) into an internal screw (not shown) integrally formed on the carriage 21.

For preventing the rotation of the carriage 21 and holding it into only the rectilinear motion, a U-shaped guide portion or a circular hole to be engaged with a cylindrical guide shaft (not shown) is generally formed in the carriage 21. The cylindrical shaft is firmly suspended from a part of the body base 20. This is not essential to the invention and thus no further illustration of it will be given here.

Reference numeral 22 designates guide grooves for the FDC 15 provided to the carriage 21. Reference numeral 23 is upper and lower receiving portions for receiving the ends of the turn arms 19. The turn arms 19a and 19b are integrally fixed at one ends to the plate spring 25 of which the free end is firmly mounted to the rear portion of the carriage 21 by means of a screw bolt 18. Pedal portions 26 are formed at the roots of the turn arms 19a and 19b. These pedal portions thus formed are combined so as to closely contact with one another. A lift arm 27 is integrally formed on the upper arm 19a at the other side of the root. The arm 27 is pulled up in a direction of an arrow A by a retract spring of a magnet (not shown) attached to the body base 20. When the magnet is energized, the plate spring 25 and an auxiliary spring 28 cooperate to return it to the original state as shown. In this manner, the magnetic head may be in contact with the disc 16. The operation continuing till this close contact of the magnetic head with the disc is completed, involves the operation relating to the invention and therefore this will be discussed in detail.

When the magnet is energized, the upper turn arm 19 descends to approach to the surface of the disc 16. In the course of the descending of the arm 19, the lower pedal 26b pushed by the upper pedal 26a is released from being pushed, so that the upper and lower turn arms 19a and 19b progressively cause the heads 1 and 1 to approach to the surfaces of the disc 16, as shown. At this time, as the head 1 on the lower turn arm 19b begins contacting with the sliding surface 10, the gimbal 52 starts to be distorted. With further progress of the deflection of the gimbal, the top of the projection 56 on the head 1 comes in contact with the end 58 of the load arm 57 integrally formed on the gimbal 13. From this point of time, the couple of the gimbal springs 13 and 52 cause a load-deflection curve to have a bending point thereby to resist the reaction force of the surface of the disc 16 to the pressure applied thereto. The turn arm 19 further descends to approach to the disc 16 and this approaching operation continues until it reaches the end 23 of the carriage 21 to come to a standstill. In this case, with the descending of the head 1, the head 1 gradually slows down to store distortion energy therein equal to the pressure by the gimbals 52 and 13.

The upper turn arm 19a carries a single gimbal spring 52. It is evident accordingly that the load-deflection curve continuously exhibits an approximate linearity till the operation ends. At the end of the operation, or in a state that both turn arms 19a and 19b are at a standstill, both the heads 1 are pushed by the distortion energy of the gimbal springs 52 and 13 to come to a standstill at a balanced point, on the basis of the action and reaction principle.

When the disc 16 rotates at the standstill point, the surface of the disc 16 moves up and down by the inherent wavy motion and the vibration. At this time, since the projection 56 on the lower head 1 is in contact with the load arm 57 on the gimbal 13, the gimbal spring 52 oscillates, bearing the head 1 thereon, with the contact of the projection with the load arm as the rotatory center for the rolling and the pitching. In this case, the motion of the gimbal spring 13 is a mere up and down motion, following the up and down movement of the disc 16.

In a condition that the upper head 1 is sliding in close contact with the upper surface of the disc 16, the upper head 1 does not posses the rotatory center unlike the lower head 1 which contains the rotatory center for the rolling and pitching therein. However, the upper head is applied with a moment by the turn following operation of the lower head 1, through the disc 16. As a result, the upper head 1 follows the disc 16 surface, being supported by the planer position keeping function of the gimbal spring 52. Therefore, the upper head 1 has a pseudorotatory center, as a result of the cooperative action of the projection 56 and the gimbal 13, for example. As described above, the present invention is to improve the embodiment disclosed in our prior application.

Figure 12:
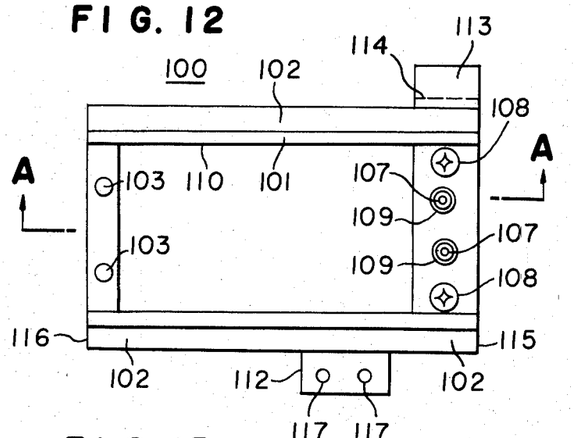
FIG. 12 is a plan view of a carriage.

The embodiment of the head supporting mechanism according to the invention will be described referring to FIGS. 12 through 23. FIG. 12 shows a carrying frame for the head supporting mechanism and generally called a carriage denoted as 100 in this example. The carriage 100 is constituted by an upper frame 101 and a lower frame 102. Reference numeral 110 represents a beam for reinforcing the upper frame 101 which is formed like a frame by the injection molding, as shown, and 103 designates spot facings for stopping the end 124 placed thereon of an arm 118 to be given later. The upper frame 101 is mounted to the lower frame 102 by means of a screw 108. The lower frame 102 also is formed like a frame by the injection moulding with jointing portions 105 and 106, thereby to have a shape like a box in one piece. Reference numeral 103a is a spot facing for stopping the end 124 placed thereon of the arm 118. The lower frame 102 is assembled into one piece by means of stud bolts 170 inserted, having upper and lower screw portions passing through a through-hole 109 of the upper frame 101. Reference numeral 112 is a projection for mounting a drive belt (not shown) for driving the carriage, which is integral with the lower frame 102. 117 is a through-hole for screwing the belt onto the mounting portion. 113 is a guide allowing a rectilinear motion of the carriage 100 and is formed projecting from the lower frame 102 and having a U-shape as viewed from its side. Reference numeral 114 is a bottom of the U-shaped groove. The U-shaped groove guide 113 is provided on the other side with a circular hole through which a circular shaft passes at the front and rear portions 15 and 16. With this construction, the carriage is accurately guided by right and left guide shafts (not shown), with a rectilinear reciprocal motion. 111 is a groove defined by the upper and lower frames 101 and 102, into which a flexible disc (not shown) is accommodated therein.

The drive belt is directly coupled with a stepping motor, for example, to position the carriage accurately.

Figure 14:
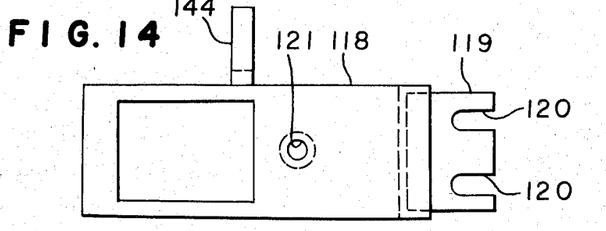
FIG. 14 is a plan view of an arm.
Figure 15:
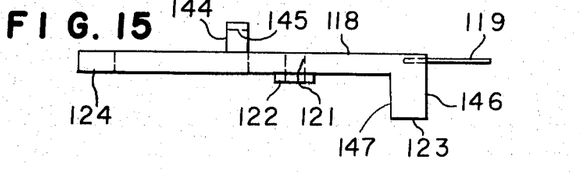
FIG. 15 is a side view of the arm in FIG. 14.

FIGS. 14 and 15 show an arm 118 formed by an injection molding for supporting a magnetic head (referred to as a head simply) 136 to be given later. It is fastened to the upper frame 101 by means of the stud bolts 107 of the lower frame passing through the U grooves 120 of the upper frame 101 in combination with nuts, for example.

A plate spring 119 is formed in one piece by an insert mold method. A through-hole 121 with a circular spot facing on the reverse side is for a screw for fastening a holder 125 to be given later as a supporting part of the head 136. An arm portion 144 formed integral with the arm 118 has a surface 145 engaging with a part of the movable portion of a magnet (not shown), for example.

Under control of the ON-OFF operation of the magnet, it moves up and down the entire of the arm 118 by the bending of the plate spring 119. The arm mounted to the lower frame 102 has no such an arm portion 144, although not illustrated, and the remaining part of it is the same as that of the arm 118.

A pedal 123 is so arranged that when the upper arm operates, the lower arm also operates simultaneously. When the upper arm 118 is operated, its surface 147 engages the surface 146 of the lower arm. Accordingly, those turn up and down about the root portion of the plate spring 119, simultaneously.

Figure 16:
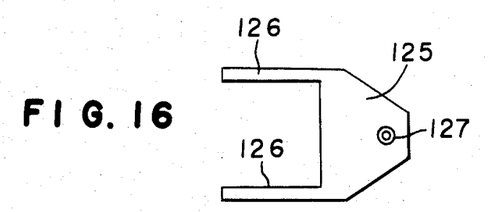
FIG. 16 is a plan view of an upper holder.
Figure 17:
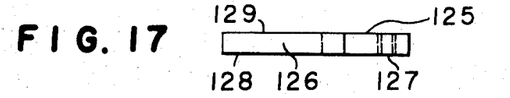
FIG. 17 is a side view of the upper holder in FIG. 16.

In FIGS. 16 and 17 illustrating the holder 125, a screw 127 holed is attached to the upper arm 118. The lower surface 128 bifurcated as shown is used to which a gimbal spring 130 to be given later is bonded by a spot welding, for example.

In attaching the holder 125 to the upper arm 118, the ends 126 of the bifurcated portion of the holder are directed toward the end face 124 of the arm 118. In this case, the upper surface of the holder 125 is in contact with the circular spot facing 122 of the arm 118, of course.

The explanation to follow is the elaboration of an assembly of the gimbal spring 130, the head 136, and the upper and the lower holders, which is essential part of the embodiment of the present invention.

In combining the gimbal spring 130 with the head 136, a ferrite core 139 of the head 136 is inserted into a rectangular hole 140 of the gimbal spring 130 and those components are mated with each other with the surface continuous to the core 139 in close contact with the surface 135 of a ground portion of the gimbal spring 130. A semicircular projection positioned at the center for the two directions crossed each other on the gimbal spring surface is coincident with the center of the gravity of the head 136 when those are assembled. Ears 132 of the spring 132 are welded to the surface 128 of the 125 by the spot welding. The diameter of the outermost ring of the spring 130 is smaller than the distance between the ends of the bifurcated portions of the holder 125 so that those are not in contact with each other. In combining the spring 130 with the holder 125, the surface of the spring 130 having the projection 134 comes in contact with the surface 128 of the holder 125.

Figures 18, 19, 20, 21:
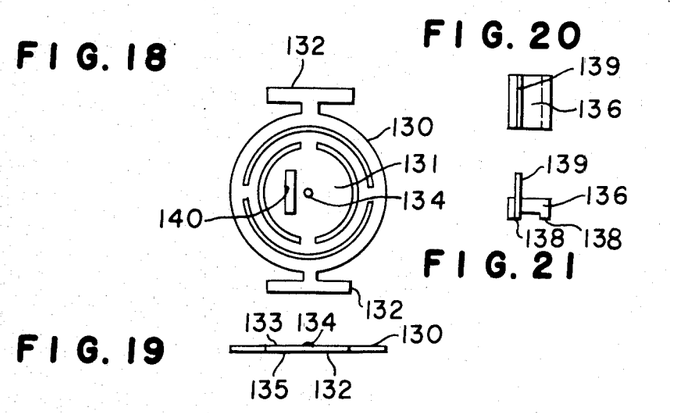
FIG. 18 is a plan view of a gimbal spring.
FIG. 19 is a side view of the gimbal spring in FIG. 18.
FIG. 20 is a plan view of a magnetic head.
FIG. 21 is a side view of the magnetic head shown in FIG. 20.

Then, a single unit of the gimbal 130 with no projection 134 and no head mounted thereto is prepared, with a load point part (not shown) projecting toward the other side, or the surface 135, of the gimbal to the surface having the projection 134. The load point part may be formed merely by bonding or a spot-welding a thin line with about 1 mm of diameter and a given length given by cutting it to the corresponding portion on the surface of the gimbal. The subassembly thus formed is fixed to the surface 129 of the holder 125 by the spot welding.

The load point (not shown) is positioned coincident with the projection 134. Accordingly, the upper and lower gimbal assemblies attached to the corresponding sides of the gimbal must be assembled so that the two directional center positions of the gimbals are coincident with each other, although a slight difference between them is allowed practically. As seen from the foregoing description, the projection 134 and the load point part (not shown) are disposed opposite to each other. The tops of them have respectively some gaps under no load condition. The upper holder 125 is thus assembled. The assembling of the lower holder 125 follows. The assembling process of the spring 130 and the head 136 shown in FIGS. 18 to 21 are exactly the same as that as mentioned above. As shown, the lower holder 151 has a beam 141 spot-welded to the central portion thereof. A load point rolling fulcrum part is spot-welded to the end of the beam 141. The beam 141 with the fulcrum part 142 is attached to the surface 191 of the holder 151, as shown. The assembly of the head 136 and the gimbal 130 is disposed on the surface 181 of the holder 151. The beam 141 may be shaped by cutting a member of the lower holder 151. Note here that the end face 143 of the load point rolling fulcrum part 142 and the projection 134 of the spring 130 are disposed with an approximate zero gap therebetween, a slight contact therebetween of a slight load application condition, or a less slight contact therebetween. The gimbal spring 130 used for the lower holder 151, which has double rings in the embodiment, may have triple or quadruplex rings to improve the flexibility of the spring. Alternatively, the gimbal spring with the double rings may be thinned more than that mounted to the upper holder 125 for obtaining the same effects.

Figures 22, 23:
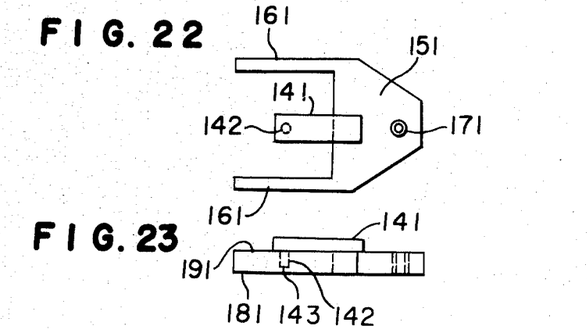
FIG. 22 is a plan view of an embodiment of the lower holder which is essential part of the present invention.
FIG. 23 is a side view of the lower holder shown in FIG. 22.

Note further that the beam 141 has a sufficient rigidity to allow a slide therealong and to prevent a distortion to develop therein when it is subjected to a load applied. Strictly, a minute amount of distortion is necessarily developed even if the load applied is extremely small. Such a minute distortion, however, causes no problem practically.

The operation of the supporting mechanism thus assembled will be described.

Figure 13:
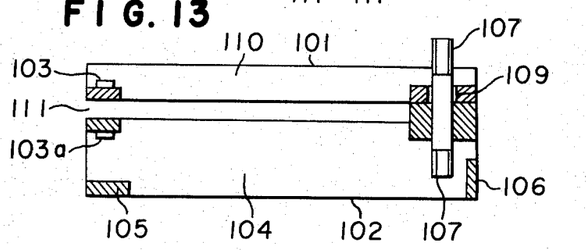
FIG. 13 is a cross sectional view taken along line A—A of FIG. 12.

The assembly of the lower holder 125 assembled on the lower arm (not shown) is mounted to the lower frame 121 of the carriage such that the sliding surface 138 of the head 136 is positioned slightly lower than the center of the groove 111. The reason for this is that is must be lowered by $\frac{1}{2}$ of the thickness of the flexibility disc (not shown).

The assembly of the upper arm 118 is so designed that when the arm end surface 124 comes in contact with the spot facing 103 of the upper frame 101, the upper and lower gimbal springs 130 on the upper holder 125 are distorted to apply a given amount of external force to the head surface 138. The projection 134 and the load point part 142 gradually narrow the gap therebetween toward zero and finally contact with each other to apply the total force of the gimbal 130 to the head surface 138. In this case, the upper and lower heads push each other with the same forces through the flexible disc on the basis of the principle of the action and reaction.

The major differences of the embodiment from the conventional supporting mechanism resides in that the lower side mechanism is fixed, the gimbal spring 130 is free from the distortion and merely takes charge of rolling and pitching, and the head may be correctly positioned. Further, since the lower side rolling point part 142 is not moved, the upper and lower load points are stable when the lower head 136 rolls and pitches. Our experiment showed that the supporting mechanism using the conventional type rectangular plate spring bearing the head for the lower side mechanism, produces an excellent output waveform. The holder 151, together with the rolling point part 142, may be formed integral with the arm 118 by the injection molding. The embodiment thus provides the head supporting mechanism superior to the conventional one. The shape of the gimbal spring, which is circular or rectangular in the above embodiments, may be any shape if it can provide a sufficient flexibility, for example, butterfly, S,Z,H,N,Y, a glass frame and the like. The jointing portions to joint the rings of the gimbal spring may be formed radially, although those extend merely bidirectionally in the above embodiment.

A second embodiment of the head supporting mechanism according to the invention will be described referring to FIGS. 24 to 29. The major features are a fixed fulcrum with a rigidity provided on either of the upper or the lower holder, the fulcrum engages with the substantial center on the plane of the head when the head slides relative to the disc, and the gimbal spring on the other holder applies mainly a pushing force to the head. The construction illustrated in FIGS. 12 to 15 are substantially the same as that of the present embodiment.

Figure 24:
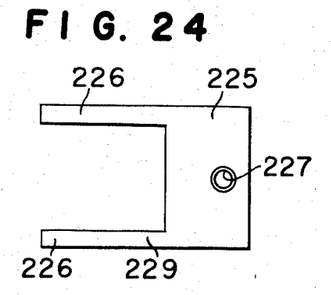
FIG. 24 is a plan view of the upper holder which an important component used in an embodiment of the present invention.
Figure 25:
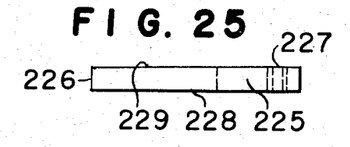
FIG. 25 is a side view of the upper holder in FIG. 24.

In FIGS. 24 and 25 illustrating the upper holder 225, reference numeral 227 is an interior screw. 226 designates bifurcated portions of which the upper and the lower surfaces 228, 229 are machined flat onto which a gimbal spring 237 and the like are mounted. When the holder 225 is attached to the arm 118, the holder is disposed such that the bifurcated portions 226 are directed toward the lower surface 124 of the arm end. To this end, the external screw 227 is coupled with the bolt (not shown) passing through the through hole 121 of the arm 118. In this case, the surface 229 of the bifurcated portion comes in contact with the circular spot facing on the arm 118.

Figure 26:
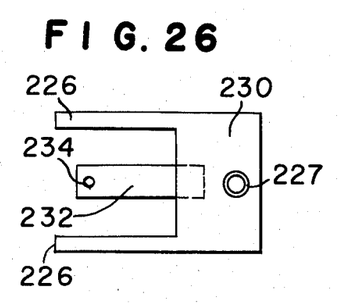
FIG. 26 is a plan view of the lower holder which is an important component used in a second embodiment of the present invention.
Figure 27:
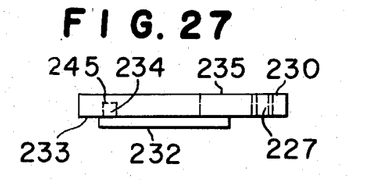
FIG. 27 is a side view of the lower holder in FIG. 26.

In FIGS. 26 and 27 illustrating the lower holder 230 mounted to the lower frame 102, reference numeral 227 designates an interior screw prepared at the lower holder 230; 226 bifurcated portions; 232 a beam with good rigidity fixed to the lower surface 233 of the lower holder by the spot welding, for example. A circular projection 234 integral with the end of the beam 232 has a flat face at the top thereof, as shown in FIG. 27. For mounting the holder 230 to the lower arm 118 shown in FIG. 14, the holder upper surface 235 is made contact with the circular facing 122 and the bifurcated portions 226 are directed toward the arm end 124. How the head 236, the gimbal springs 237 and the like are mounted to the upper and lower holders 225 and 230, will be described referring to FIGS. 25, 27, 28 and 29. The head 236 has a surface 238 sliding over the disc surface. Reference numeral 239 is a ring type core made of ferrite, as schematically illustrated. In the core 239, a read/write core and an erasing core are arranged rectilinearly and firmly sandwiched by sliding members from both sides thereof. The coil wound around the core section 239 and the like are not essential to the present invention and therefore the explanation thereof will be omitted.

Figure 28:
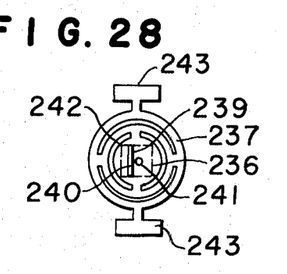
FIG. 28 is a plan view of an assembly part which is important in the second embodiment of the invention.
Figure 29:
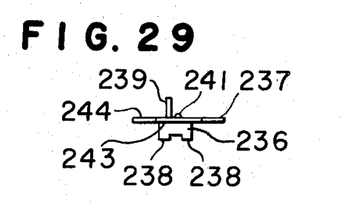
FIG. 29 is a side view of the assembly part in FIG. 28.

Reference numeral 237 designates a gimbal spring formed by etching, for example, a given spring plate member. Reference numeral 240 designates a rectangular hole passing through the core 239. Numeral 241 designates a projection embossed and herein after referred to as a load point. Numeral 242 is representative of a ground portion for forming the load point 241. 243 denotes ears for firmly mounting the gimbal spring 237 to the upper and lower holders 225 and 230 by the spot welding, for example. As easily seen, the head 236 is mounted to the gimbal spring 237 in a manner that its core 239 is inserted into the rectangular hole 240 and it is bonded onto the ground portion 242 of the gimbal spring 237 by adhesive.

In the above-mentioned assembly, the surface 244 of the gimbal spring 237 is made contact with and bonded to the upper surface 235 of the lower holder 230 by the spot welding. The center of the load point 241 is arranged so as to be substantially coincident with the center of the circular projection 234 integral with the beam 232 on the lower holder 230. Desirably, the center of gravity on the plane of the head 236 is coincident with the center of the load point 241 as accurately as possible. Note here that the top of the load point 241 and the flat top 245 of the circular projection 234 have a given gap therebetween. Another embodiment employs a zero gap, a slight gap or a slight contact. Its operation will be described later. The explanation to follow is for the head 236 and the gimbal spring 237 mounted to the upper holder 225. The construction and shape of the assembly are the same as those of the lower holder 230, except that there is no need for forming the load point 241 on the gimbal spring 237. In assembling, the surface of the 237 is made contact with the lower surface 228 of the upper holder 225 and the ears 243 are fixed to the bifurcated portions 226, suspending from the latter, by the spot welding or the like.

Following the description of the structure and construction of the head supporting mechanism, the operation of the head supporting mechanism will be given. All the assemblies or components including the arm 218 mounted on the carriage operate in the following manner. The plate like projection 112 integral with the lower frame 102 shown in FIG. 12 is firmly coupled with the steel belt by the bolts (not shown) passing through the circular holes 117 formed, the steel belt being coupled at the other end with the stepping motor assembly fixed to the base (not shown) of the drive apparatus. With this coupling, the rectilinear reciprocal motion of the carriage along the shaft and the positioning the head 236 at a commanded track on the disc face are performed through the drive by the stepping motor. For avoiding wear of the head sliding surface 238 of the head 236, it engages the surface 145 of the arm portion 144 of the arm 118 shown in FIG. 15 when the head 236 is moving. A part of the solenoid magnet coupled with the base on the drive apparatus raises the upper arm 118 by means of the spring contained in the magnet when the magnet electrical state is OFF, thereby to separate the head 236 from the disc surface. At the time that the head has been moved above a given track on the disc, the magnet is fed with current to make the upper arm 118 to descend through the engaging surface, while resisting the spring force, and to make the top surface 124 of the arm 118 contact with the spot facings 103 on the frame 101 and 102, and then stops its operation. In this operation, the upper and lower arms simultaneously operate since the pedal 123 of the lower arm 118 comes in contact with the surface 147 of the upper arm 118. This operation is realized by converting the turning motion caused by the bending of the plate spring 119 integral with the arm 118 into the up and down motion of the ends of the upper and the lower arms. A cycle of the up and down motions involves the operation essential to the invention. As described above, in the holder 230 on the lower arm 118, one embodiment keeps a given gap between the load dimple of the gimbal spring 237 supporting the head 236 and the circular projection of the beam 232. When the sliding surface 238 of the head 236 starts to be contact with the disc surface, the gimbal accordingly starts its distortion. With the progress of the distortion, as the distortion reaches a given amount of it, the projection 245 contacts the top of the load dimple 241 to stop the distortion. At this time point, the end surface 224 of the lower arm 218 does not contact the circular spot facing 103a, so that it moves a given distance, while the dimple 241 is placed on the circular projection end 245. As stated previously, the holder 225 on the upper arm 118 has neither the load dimple 241 or the beam 232. Accordingly, the gimbal spring 237 completely charges the full distortion in the process that the upper arm 118 makes the head 236 approach to the disc surface and those are in close contact with each other.

More specifically, when the sliding surface 238 of the head 236 supported by the lower arm 118 closely contacts the lower surface of the disc, the gimbal spring 237 supporting the head 236 is sandwiched by the disc surface and the circular projection 234, thereby allowing a slight amount of distortion. This state indicates that the lower side gimbal spring 237 provides a very small pushing force and principally supports the head 236 in its plane. As described above, the upper gimbal spring 237 provides the full distortion, so that the upper head 236 exerts a force onto the lower head 236 through the disc. The forces exerting on both surfaces of the disc are equal to each other on the basis of the action and reaction principle.

With respect to the other combination of the lower holder 230 as a third embodiment of the invention, the zero gap is generally provided between the load dimple 241 and the circular projection 234. For this reason, the lower gimbal 237 as in the above-mentioned embodiment provides no distortion, so that the lower arm action merely makes the head 236 contact with the disc surface closely. Since the head on the holder 225 supported by the upper arm 118 has the same structure and construction as those of the above-mentioned embodiment, its operation is the same as that of the embodiment.

In the construction of this combination, only the distortion energy of the upper gimbal spring 237 serves as a pushing force of both the heads 236 against the disc surface. In the two embodiments, the lower gimbal 237 is provided for keeping the magnetic gap (not shown) of the head 236 under a disc-surface close-contact condition, and for improving the following characteristic for the disc surface oscilillating phenomena, i.e. pitching and rooling. Accordingly, when three rings or four rings type gimbal spring, for example, are used in place of the two-ring type gimbal spring 237, its flexibility is improved. Such an attempt is desirable. For improving the position stability, a three-directional crossed fulcrum method may be employed in place of the two-directional crossed fulcrum method employed in the embodiment illustrated. The multiple-ring type gimbal spring is effective for alleviating the damages on the disc surface and the head sliding surface when those are in contact with each other. The idea that the gap is provided between the load dimple and the circular projection 234 and the gimbal 237 is slightly distorted, which is employed in one embodiment as mentioned above is a mere countermeasure for alleviating the damage. A further notable thing is that because of the sufficient rigidity of the beam 232 on the lower holder 230, it is free from a plane oscillation, so that a friction between the projection 245 and the dimple 241 may be effective under the pushed state. This greatly contributes to stabilize the positioning. On the other hand, the upper gimbal 237 is provided for providing a pushing force, so that a distortion in the longitudinal direction is increased. As a result, the oscillation is increased to possibly deteriorate the positioning stability. In this respect, the two-ring type gimbal as illustrated is desirable. If increase of the distortion is necessary, the multiple ring type gimbal is used with a multi-directional crossed fulcrum method for improving the stability.

A fourth embodiment of the head supporting mechanism according to the invention will be described which is for improving the stability of the magnetic gap position and for alleviating the mutual damages of the disc and the head when those are in contact with each other. The assembly of the upper arm 118 in this embodiment is the same as those of the second and third embodiment. In this embodiment, however the circular projection 234 of the beam 232 of the holder on the lower arm 118 made of material, which is more soft and higher in the friction coefficient than metal, such as plastic or hard polyurethane rubber. The projection is shaped like a semicircuit in cross section with a given curvature. In this case, no load dimple is formed on the ground portion 242 of the gimbal 237 shown in FIG. 28 with the surface being left plane. In the assembled state, the given gap between the load dimple 241 and the circular projection 234 may be so arranged that an engaging state with respect to the zero gap is held between the plane of the ground portion 242 and the top of the circular projection.

In the fourth embodiment, when the lower gimbal spring 237 and the top of the projection 245 are in contact with each other, a minute distortion is developed to absorb an impact. The slip occurring in the relative motion between them is eliminated because of use of the large frictional material. This feature greatly contributes to improve the position stability.

The circular projection may be bonded to the beam 232 with adhesive. Alternatively, the projection 234 the same as those of embodiments 2 and 3 is used while the load dimple 241 embossed on the gimbal spring 237 is made of the soft material and is bonded to the corresponding position by means of a suitable means.

In addition to the above description relating to the construction, operation and useful effects of the second to fourth embodiments of the invention, some conventional head supporting mechanism which are apparently similar to the invention but are distinctly different from the invention, will be referred to hereinafter. One of them is that the head 236 shown in FIG. 29 is directly fixed to a given position of the frame 102 without the plate spring being intervening therebetween. This example is lack of the holder 230 and the arm 118 which are used in the present invention. The upper arm 118 and the like in this example are substantially the same as those of the present invention. The difference of the example from the present invention resides in that the load dimple 241 is formed on the upper head supporting spring and is pushed by another cantilever type spring. Another conventional example uses a plate spring intervening between the lower frame 102 and the head 236 for fixing them. The difference from the present invention, which is commonly found in the two examples is the head 236 on the lower arm 118 never performs the up and down motion in a turning way. One of the examples is defect in that because of no load dimple 241, the rotatory center of the head on the supporting spring is not fixed and accordingly the following characteristic on the disc is poor. The defect of the other example is that because of no supporting plate spring, only the way to improve the closeness of the head contact with the disc surface is to increase the pushing force, thus resulting in increase of the damages of the disc and the head 236.

As described above, the head supporting mechanism according the invention places the rotatory center of the head on either of them, and supports the head with a sufficient rigidity. Means for improving the following characteristic is designed to provide insufficient plane stress accumulated when it is distorted in order that the supporting spring with the rotatory center fully exhibits its flexibility. Additionally, at the time of the application of pushing force, the load dimple 241 has increased friction to enhance the position stability of the head 236. The supporting mechanism with such useful feature according to the invention is very excellent. Furthermore, the constructions of the upper and the lower arms 118 are simple, so that the number of the parts and components, and the steps of the assembling process is reduced, leading to provide economical and practical magnetic head supporting mechanisms.

We claim:

1. A magnetic head supporting mechanism for a double side type flexible disc drive apparatus which comprises:

means for rotatably driving an interchangeable double side type flexible disc;

first and second magnetic heads for read-out or write-in on each magnetic recording surface respectively of said double side type flexible disc; and said magnetic heads being slidably contacted with said magnetic recording surface during the operation for the read-out or write-in;

a carriage driven by means for positioning said first and second magnetic heads on a predetermined data track of said double side type flexible disc; and said carriage comprising first and second frame elements mounting first and second arms, means for rotating at least one of said first and second arms out of read-out/write-in position and first and second magnetic head assemblies respectively mounted on said first and second arms; wherein one of said magnetic head assemblies comprises one of said magnetic heads; a resilient holder consisting of a part fixed to said arm and a part for supporting to said magnetic head; a gimbal spring disposed on said supporting part of said holder and having a surface fixed to said head and a projection formed on the back surface opposite to the surface fitting said magnetic head; and a point member fixed on said holder at one end and contacting said projection at the other end.

2. The magnetic head supporting mechanism according to claim 1 wherein said projection formed on said gimbal spring is formed by stamping.

3. The magnetic head supporting mechanism according to claim 1 wherein said projection formed on said gimbal spring is formed by a spot welding.

* * * * *